3,190,809
PROCESS FOR THE PREPARATION OF 11α-HYDROXY-Δ⁴-3-KETO STEROIDS FROM 11-UNSUBSTITUTED Δ⁵-3-HYDROXY AND 3-ACYLOXY STEROIDS USING *PSILOCYBE CAERULESCENS* VAR. *MAZATECORUM*

Carlos Casas-Campillo, Mexico City, Mexico, assignor to Syntex Corporation, Panama, Panama, a corporation of Panama
No Drawing. Filed May 6, 1963, Ser. No. 278,415
Claims priority, application Mexico, May 31, 1962, 67,568
3 Claims. (Cl. 195—51)

This invention relates to a novel process for preparing cyclopentanoperhydrophenanthrene derivatives.

More particularly, this invention relates to a novel process for preparing 11α-hydroxy-Δ⁴-3-keto steroids from the corresponding Δ⁵-3-hydroxy and -3-acyloxy compounds which are unsubstituted at the 11-position by incubation of said Δ⁵-steroids with the microorganism *Psilocybe caerulescens* var. *mazatecorum*.

Many steroids posessing the Δ⁴-3-keto grouping and an oxygenated function at the 11-position are either therapeutic agents or intermediates for the preparation of other steroids having therapeutic activity. For example, 11α-hydroxy steroids may be converted by known methods into the corresponding 9α-halo-11β-hydroxy and 9α-halo-11-keto compounds.

It is known in the art that several microorganisms, and especially those belonging to the Rhizopus genus, effect the introduction of an 11α-hydroxyl group into the steroid molecule.

Furthermore, microbiological oxidation of Δ⁵-3-hydroxy steroids to the corresponding Δ⁴-3-keto compounds has also been previously described. Thus, for example, U.S. Patent No. 2,915,439 discloses the oxidation of pregnenolone to progesterone using cultures of different species of Streptomyces, such as *S. aureofaciens, S. griseus, S. fradiae, S. lavendulae, S. argenteolus, S. olivaceous,* and the like. Similarly, the oxidation of Δ⁵-androstene-3β,17β-diol by means of Flavobacterium to give either Δ⁴-androstene-3,17-dione or testosterone has been described by A. Ercoli in Boll. Sci. fac. Chim. ind. (Bologna), 10 (1940), and in Z. physiol, Chem. 370, 266 (1941).

In copending U.S. patent application Serial No. 139,069, filed September 19, 1961, now U.S. Patent No. 3,118,822, issued January 21, 1964, the introduction of an 11α-hydroxyl group into various steroids by incubation with microorganisms of the Agaricaceae family, Agaricales order, genus Psilocybe, Stropharia and Conocybe has been described.

The present invention resides in the surprising discovery that the microorganism *Psilocybe caerulescens* var. *mazatecorum* can effect, in one single incubation with a steroid starting material of the character described, the saponification of esterified hydroxyl groups, the oxidation of a hydroxyl group at the 3-position to the corresponding keto group with concomitant shift of the double bond at the 5,6-position to the 4,5-position, thus producing the α,β-unsaturated ketone, and the introduction of a hydroxyl group at the 11α-position.

The oxidation method of the present invention can be employed to treat steroid compounds of the androstane, pregnane, cholestane and sapogenin series, preferably those containing from 18 to 27 carbon atoms. Furthermore other substituents may be present in various positions of the steroid molecule, such as keto groups, hydroxyl groups, halogen atoms, alkyl, alkenyl and alkinyl radicals, and the like. Free hydroxyl groups in the steroid starting material can be esterified with acyl groups containing less than 12 carbon atoms, preferably hydrocarbon carboxylic acyl groups such as acetyl, propionyl, butyryl, enanthyl, and the like.

Thus, for example, pregnenolone acetate, when treated in accordance with the process of the present invention, provides 11α-hydroxyprogesterone, while from the 3,21-diacetate of Δ⁵-pregnene-3β,17α,21-triol-20-one there is obtained Δ⁴-pregnene-11α,17α,21-triol-3,20-dione (11-epi "F").

In practicing the process of the present invention, a culture of *Psilocybe caerulescens* var. *mazatecorum*, ATCC 13964, is incubated under aerobic conditions in a suitable culture medium, i.e., one containing carbohydrates, salts, and organic nitrogen sources, at a temperature between about 25° C. and 28° C., until an abundant growth of the mycelium is obtained, usually in approximately 3 to 5 days.

The mycelium is then dispersed and aliquot quantities of this dispersion are added to larger quantities of the same culture medium. The steroid starting material is then added, either in solid form or as an alcohol or acetone solution, and incubation is resumed under aerobic conditions, usually for from about 12 hours to about 3 days, following which the reaction product is isolated by extraction with a suitable solvent.

Alternatively, the culture medium may be seeded under sterile conditions with the culture of *Psilocybe caerulescens,* and either simultaneously or when the growth of the microorganism has been initiated, the steroid starting material is added. However, the method which affords best results is that where the microorganism is first developed in a suitable culture medium, under aerobic conditions and in the absence of the steroid starting material. The resulting mycelium is then separated by filtration and resuspended in a freshly prepared culture medium in which the steroid starting material has also been suspended.

Enzymatic preparation of the oxygenating microorganism can also be employed, using methods which are well known to those skilled in the art.

In general a concentration of the steroid starting material of about 5% by weight, based on the total weight of the substrate, will be employed, although concentrations greater or less than this amount can also be used.

The culture media which can be used preferably contain dextrose as the carbon source and Phytone (an enzymatic digest of soya meal; Baltimore Biol. Lab., Baltimore, Md.), as the nitrogen source. However, in place of or together with dextrose other carbohydrates, such as starch, sugar cane, latcose, glycerol, maltose, and the like can be used. Similarly, soy bean flour, corn flour or other commercial products, such as Casitone, Edamine, Mycolphil, Nutrient L–1 (lactalbumin hydrolyzate; Sheffield Farms, Norwich, N.Y.), or NZ-amine (pancreatic hydrolyzate of caseine; Baltimore Biol. Lab., Baltimore, Md.), can be used instead of Phytone.

When the oxygenation process is complete, the product is recovered from the culture medium by extraction with a solvent which is immiscible with water, preferably a chlorinated hydrocarbon such as methylene chloride, ethylene dichloride, chloroform, trichloroethane, and the like. Particularly good results are obtained when the extraction of the product is effected with hot ethylene dichloride at temperatures between 40° C. and 80° C. The extract thus obtained is then reduced to a small volume or evaporated to dryness. The residue can be purified by any of several methods, the most common being chromatography and crystallization.

The yields obtainable by the process of the present invention will vary depending on such factors as the steroid starting material employed, the culture medium used, the incubation time, and the like.

In general, yields ranging from 30% to 40% are obtained.

The following examples illustrate the invention but are not intended to limit its scope:

*Example I*

A culture of *Psilocybe caerulescens* var. *mazatecorum* (Heim), ATCC 13964, was maintained by serial transference every two weeks in a mycophil-agar medium which was incubated at a temperature of between 25° C. and 28° C. The growth obtained in an inclined agar tube was then suspended in 10 cc. of sterile water, and 2 cc. of this suspension were used to inoculate an Erlenmeyer flask containing 200 cc. of the following culture medium:

| | Grams |
|---|---|
| Phytone | 2 |
| Dextrose | 2 |
| Water to 200 cc. | |

The culture was incubated under rotatory stirring (200 r.p.m.) at between 25° C. and 28° C. for 3 days, following which the mycelium was dispersed, using a blendor. A 20 cc. sample of the resulting microbial suspension was used to inoculate each of ten 1 liter Erlenmeyer flasks, each containing 200 cc. of the Phytone-Dextrose culture medium described above.

The each flask there was added 50 mg. of the 3,21-diacetate of Δ⁵-pregnene-3β,17α,21-triol-20-one, and the resulting reaction mixture was stirred, under aeration, for 72 hours at a temperature of between 25° C. and 28° C. Next, the contents of the flask were combined and extracted several times with methylene chloride, the extract was washed with water, dried over anhydrous sodium sulfate and evaporated to dryness under reduced pressure. The residue was adsorbed in a column charged with 12 grams of silica-gel and 12 grams of celite, yielding 150 mg. of Δ⁴-pregnene-11α,17α,21-triol-3,20-dione, M.P. 217–219° C., identical with an authentic sample of 11-epi "F."

*Example II*

The procedure employed in Example I was repeated in every detail except one, namely, Casitone was substituted for Phytone in the culture medium. 11-epihydrocortisone was again produced.

*Example III*

In accordance with the method described in Example I, the compounds listed below under I were converted into their respective 11α-hydroxy-Δ⁴-3-keto derivatives (II)

| I | II |
|---|---|
| Δ⁵-pregnen-3β-ol-20-one acetate | 11α-hydroxyprogesterone. |
| Δ⁵-pregneno-3β,17α-diol-20-one | 11α,17α-dihydroxyprogesterone. |
| Δ⁵-pregnene-3β,21-diol-20-one diacetate. | Δ⁴-pregnene-11α,21-diol-3,20-dione. |
| 16α-methyl-Δ⁵-pregnen-3β-ol-20-one | 16α-methyl-11α-hydroxy-progesterone. |
| 16α-methyl-Δ⁵-pregnene-3β,17α,21-triol-20-one 3,21-diacetate. | 16α-methyl-11-epihydrocortisone. |
| 17α-methyl-Δ⁵-androstene-3β,17β-diol. | 17α-methyl-11α-hydroxytestosterone. |

*Example IV*

A vegetative growth of *Psilocybe caerulescens* var. *mazatecorum*, ATCC 13964, was prepared under aeration in the same medium described in Example I. To the resulting culture there was added a 2% ethanol solution of Δ⁵-pregnen-3β-ol-20-one, with 10 mg. of this compound being added for each 50 cc. of the culture medium. The resulting reaction mixture was stirred at between 25° C. and 28° C. under aeration for 5 days, and then extracted with hot ethylene dichloride. The extract was washed with water, dried over anhydrous sodium sulfate, and evaporated to dryness under vacuo. The residue was purified by chromatography on silica gel to give 11α-hydroxyprogesterone, identical to an authentic sample.

I claim:

1. A process for the preparation of an 11α-hydroxy-Δ⁴-3-keto-steroid in one incubation from the corresponding steroid starting material selected from the group consisting of an 11-desoxy-Δ⁵-3-hydroxy steroid and an 11-desoxy-Δ⁵-3-acyloxy steroid of the androstane, pregnane, cholestane and sapogenin series which comprises subjecting said steroid starting material to the oxygenating action of enzymes produced by the microorganism *Psilocybe caerulescens* var. *mazatecorum*.

2. A process as described in claim 1 wherein said steroid starting material is the 3,21-diacetate of Δ⁵-pregnene-3β,17α,21-triol-20-one and the product obtained is 11-epihydrocortisone.

3. A process as described in claim 1 wherein said steroid starting material is Δ⁵-pregnen-3β-ol-20-one 3-acetate and the product obtained is 11α-hydroxyprogesterone.

References Cited by the Examiner

UNITED STATES PATENTS 2,966,444  12/60  Hasagowa et al. _____ 195—51

A. LOUIS MONACELL, *Primary Examiner.*